United States Patent
Shen et al.

(10) Patent No.: US 10,822,045 B1
(45) Date of Patent: Nov. 3, 2020

(54) PIVOTING MECHANISM AND CARRIER POSITIONING DEVICE INCLUDING THE SAME

(71) Applicant: KING ROOF INDUSTRIAL CO., LTD., Taichung (TW)

(72) Inventors: Shih-Chieh Shen, Taichung (TW); Chun-Yi Hsieh, Taichung (TW)

(73) Assignee: KING ROOF INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/838,103

(22) Filed: Apr. 2, 2020

(51) Int. Cl.
| | |
|---|---|
| *B62H 3/12* | (2006.01) |
| *A47F 5/00* | (2006.01) |
| *A47B 46/00* | (2006.01) |
| *A47F 5/01* | (2006.01) |
| *B62H 3/00* | (2006.01) |
| *A47F 5/08* | (2006.01) |

(52) U.S. Cl.
CPC ............... *B62H 3/12* (2013.01); *A47B 46/00* (2013.01); *A47F 5/0037* (2013.01); *A47F 5/01* (2013.01); *A47F 5/08* (2013.01); *B62H 3/00* (2013.01)

(58) Field of Classification Search
CPC .... B62H 3/12; B62H 3/00; B60R 9/10; Y10T 292/0868; Y10T 292/0887; Y10T 292/0866; Y10T 292/0886; Y10T 292/0867; Y10S 292/37; Y10S 292/60; Y10S 292/0863
USPC ............ 211/17–24, 100, 95, 96; 248/292.12, 248/316.8
See application file for complete search history.

(56) References Cited

U.S. PATENT DOCUMENTS

| | | | | |
|---|---|---|---|---|
| 107,763 | A * | 9/1870 | Cutting .............. | A47G 25/0685 211/96 |
| 716,214 | A * | 12/1902 | Gagnon ................. | A47G 7/045 248/290.1 |
| 2,046,824 | A * | 7/1936 | Kenney .................. | A47H 1/022 160/334 |
| 3,844,517 | A * | 10/1974 | Fraser .................... | A47B 91/16 248/188.3 |
| 4,856,661 | A * | 8/1989 | Guillen ................. | A47F 5/0876 211/100 |
| 5,123,768 | A * | 6/1992 | Franklin .............. | A46B 5/0075 403/84 |
| 5,303,857 | A * | 4/1994 | Hewson .................... | B60R 9/06 224/282 |

(Continued)

FOREIGN PATENT DOCUMENTS

| | | |
|---|---|---|
| TW | M507884 U | 9/2015 |
| TW | I504489 B | 10/2015 |

(Continued)

*Primary Examiner* — Jonathan Liu
*Assistant Examiner* — Devin K Barnett
(74) *Attorney, Agent, or Firm* — Muncy, Geissler, Olds & Lowe, P.C.

(57) ABSTRACT

A pivoting mechanism includes a rotation assembly and a fixation assembly. The rotation assembly includes a first member and a second member which are rotatable with respect to each other. The fixation assembly includes a first fixation member, a first elastic member, and a first pushing member. The first fixation member is received in the rotation assembly. The first fixation member selectively blocks the first member and the second member. The first fixation member is disposed between the first elastic member and the first pushing member.

8 Claims, 11 Drawing Sheets

(56) References Cited

U.S. PATENT DOCUMENTS

| | | | | |
|---|---|---|---|---|
| 5,542,151 | A * | 8/1996 | Stranski | A47D 13/063 16/326 |
| 6,105,795 | A * | 8/2000 | Terragni | A47G 25/02 211/100 |
| 6,113,160 | A * | 9/2000 | Johansson | E05B 5/003 292/169 |
| 6,286,738 | B1 * | 9/2001 | Robins | B60R 9/06 224/314 |
| 6,422,443 | B1 * | 7/2002 | Erickson | B60R 9/06 224/492 |
| 6,629,801 | B2 * | 10/2003 | Cheng | B62B 9/20 280/642 |
| 6,644,525 | B1 * | 11/2003 | Allen | B60R 9/06 224/282 |
| 6,948,197 | B1 * | 9/2005 | Chen | A47D 5/006 403/97 |
| 6,983,853 | B1 * | 1/2006 | Fickett | A47F 5/04 211/18 |
| 7,055,725 | B1 * | 6/2006 | Kolda | B60R 9/06 224/497 |
| 7,631,575 | B2 * | 12/2009 | Gard | F16C 11/10 74/530 |
| 7,704,123 | B2 * | 4/2010 | Marsic | B28D 1/045 451/8 |
| 7,810,685 | B2 * | 10/2010 | Bove | B60R 9/10 224/324 |
| 8,028,878 | B1 * | 10/2011 | Pedrini | B60R 9/06 224/495 |
| 8,047,492 | B2 * | 11/2011 | Wang | B62H 3/12 248/307 |
| 8,132,978 | B2 * | 3/2012 | Franklin | F16C 11/10 403/96 |
| 8,235,223 | B2 * | 8/2012 | Winig | A47F 7/0243 211/7 |
| 8,573,456 | B2 * | 11/2013 | Farber | B60R 9/06 224/504 |
| 8,661,619 | B2 * | 3/2014 | Lu | A47C 17/86 16/326 |
| 9,815,415 | B2 * | 11/2017 | Condon | B60R 9/10 |
| 10,383,307 | B2 * | 8/2019 | Nelson | F16C 11/10 |
| 2002/0131814 | A1 * | 9/2002 | Hou | B62B 9/20 403/97 |
| 2006/0032880 | A1 * | 2/2006 | Settelmayer | B60R 9/048 224/497 |
| 2006/0060623 | A1 * | 3/2006 | Huang | B60R 9/10 224/504 |
| 2008/0109994 | A1 * | 5/2008 | Liao | B62B 3/12 16/319 |
| 2008/0197642 | A1 * | 8/2008 | Talpe | E05B 13/005 292/336.3 |
| 2011/0226709 | A1 * | 9/2011 | Yen | B62H 3/04 211/17 |
| 2017/0253188 | A1 * | 9/2017 | Shen | B60R 9/10 |
| 2018/0134229 | A1 * | 5/2018 | Shen | B60R 9/06 |

FOREIGN PATENT DOCUMENTS

| | | |
|---|---|---|
| TW | I619630 B | 4/2018 |
| TW | M577390 U | 5/2019 |

* cited by examiner

PIVOTING MECHANISM AND CARRIER POSITIONING DEVICE INCLUDING THE SAME

BACKGROUND OF THE INVENTION

Field of the Invention

The present invention relates to a carrier positioning device, more especially to a carrier positioning device including a pivoting mechanism.

Description of the Prior Art

A normal bicycle usually has a kickstand to erect the bicycle. However, road bicycles usually don't have the kickstand for the safety reason. Thus, the bicycle has to be fixed by other devices when parking or maintenance. The fixation devices are shown in patents TW M577390, TW 1619630, TW 1504489, and TW M507884.

However, the suspension device of TW M507884 is fixed, so it can only correspond to a specific position of the bicycle. Thus, the device cannot be used on various types of bicycles. The maintenance rack of TW 1504489 is foldable, but it can only correspond to the specific type of bicycle too, as shown in FIG. 7 of TW 1504489. The suspension rack of TW M577390 hooks on the wheel of the bicycle and is available for different bicycles. However, the fixation is weak, and the bicycle is hung unstably. In addition, the wheel rim may deform.

SUMMARY OF THE INVENTION

The main object of the present invention is to provide a pivoting mechanism and a carrier positioning device including the pivoting mechanism. The pivoting mechanism can be switched between a rotation mode and a locking mode. The vehicle fixation can be closed, or the angle of supporting can be adjusted via the pivoting mechanism.

To achieve the above and other objects, the pivoting mechanism of the present invention is adapted for a carrier positioning device. The pivoting mechanism includes a rotation assembly and a fixation assembly.

The rotation assembly includes a first member and a second member. The first member and the second member are coaxially arranged along an axis and are rotatable around the axis. The first member is rotatable with respect to the second member along a rotation direction. The first member includes at least one first coupling portion and a first space. The at least one first coupling portion extends into the first space along a direction nonparallel to the axis. The second member includes at least one second coupling portion and a first space. The at least one second coupling portion extends into the second space along a direction nonparallel to the axis. The second space communicates the first space along the axis to form a first receiving room. The fixation assembly includes a first fixation member, a first elastic member, and a first pushing member. The first fixation member is received in the first receiving room and is movable along the axis between a locking position and a release position. The first fixation member blocks at least one of the at least one first coupling portion and at least one second coupling portion along the rotation direction. The first elastic member is received in the first receiving room to normally push the first fixation member toward the locking position. The first pushing member is inserted through the rotation assembly to insert into the first receiving room so as to drive the first fixation member to move toward the release position. The locking position is defined at a situation that the first fixation member blocks both the at least one first coupling portion and the at least one second coupling portion along the rotation direction, and that the first member is nonrotatable with respect to the second member. The release position is defined at a situation that the first fixation member is completely received in the first space, that the at least one second coupling portion is not blocked by the first fixation member along the rotation direction, and that the second member is rotatable with respect to the first member.

To achieve the above and other objects, the carrier positioning device of the present invention includes an extension assembly, at least one said pivoting mechanism mentioned above, at least one pivot arm, and at least one suspension member.

The extension assembly includes a fixed rod and an extending rod. The extending rod is movably disposed on the fixed rod. The first member of the at least one pivoting mechanism is disposed on the extending rod. The at least one pivot arm is connected to the second member of the at least one pivoting mechanism to be pivotable with the second member. The first pushing member of the at least one pivoting mechanism is inserted through the at least one pivot arm along the axis for being pressed. The at least one suspension member is disposed on the at least one pivot arm and is formed with a recessed supporting portion. The supporting portion is adapted for receiving a part of a vehicle.

To achieve the above and other objects, the carrier positioning device includes a main rod, a plurality of supporting rods, a plurality of restriction members, a plurality of said pivoting mechanisms mentioned above, and a plurality of auxiliary pivoting mechanisms.

The restriction members are disposed on the supporting rods and are for abutting against and restrict a vehicle. The first members of the pivoting mechanisms are disposed on the main rod. The second members of the pivoting mechanisms are disposed on the supporting rods. The first pushing members of the pivoting mechanisms are arranged along the axis. Each of the auxiliary pivoting mechanism includes a third member, a fourth member, a second fixation member, a second elastic member, and a second pushing member. The third member and the fourth member are coaxially arranged along the axis and are rotatable with respect to each other. The third member includes at least one third coupling portion and a third space. The at least one third coupling portion extends into the third space along a direction nonparallel to the axis. The fourth member is connected to the first member. The fourth member includes at least one fourth coupling portion and a fourth space. The at least one fourth coupling portion extends into the fourth space along a direction nonparallel to the axis. The fourth space communicates the third space along the axis. The second fixation member blocks at least one of the at least one third coupling portion and the at least one fourth coupling portion along the rotation direction. The second elastic member is received in the second receiving room. The second pushing member is movably inserted through the fourth member to selectively push the second fixation member. The third member and the second member are arranged coaxially. The first pushing member is inserted through the second member and the third member and into the second receiving room to abut against the second fixation member so that the first fixation member, the first pushing member, and the second fixation member are movable coaxially. When the first fixation member is located at the locking position, the second fixation member blocks the at least one third coupling portion and the at least one fourth coupling portion. When the first fixation member is located at the release position, the second fixation member blocks the at least one third coupling portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 8 for the first embodiment of the present invention. The pivoting mechanism 1 is adapted for a carrier positioning device 6A. The pivoting mechanism 1 includes a rotation assembly 11 and a fixation assembly 4.

The rotation assembly 1 includes a first member 2 and a third member 3. The first member 2 and the third member 3 are arranged coaxially along an axis 91 and are rotatable with respect to each other around the axis 91. A relative rotation direction of the first member 2 and the second member 3 is defined as a rotation direction 92. Specifically, the first member 2 includes at least one first coupling portion 21 and a first space 24. The at least one first coupling portion 21 extends into the first space 24 along a direction nonparallel to the axis 91. The second member 3 includes at least one second coupling portion 31 and a second space 34. The at least one second coupling portion 31 extends into the second space 34 along a direction nonparallel to the axis 91. The second space 34 communicates the first space 24 along the axis 91 to form a first receiving room 12.

The fixation assembly 4 includes a first fixation member 41, a first elastic member 42, and a first pushing member 43. The first fixation member 41 is received in the first receiving room 12 and is movable along the axis 91 between a locking position and a release position. The first fixation member 41 blocks at least one of the at least one first coupling portion 21 and the at least one second coupling portion 31 along the rotation direction. The first elastic member 42 is received in the first receiving room 12 to normally push the first fixation member 41 toward the locking position. The first pushing member 43 is inserted through the rotation assembly 11 to insert into the first receiving room 12 for being operated to drive the first fixation member 41 to move toward the release position.

Figures 4, 5:
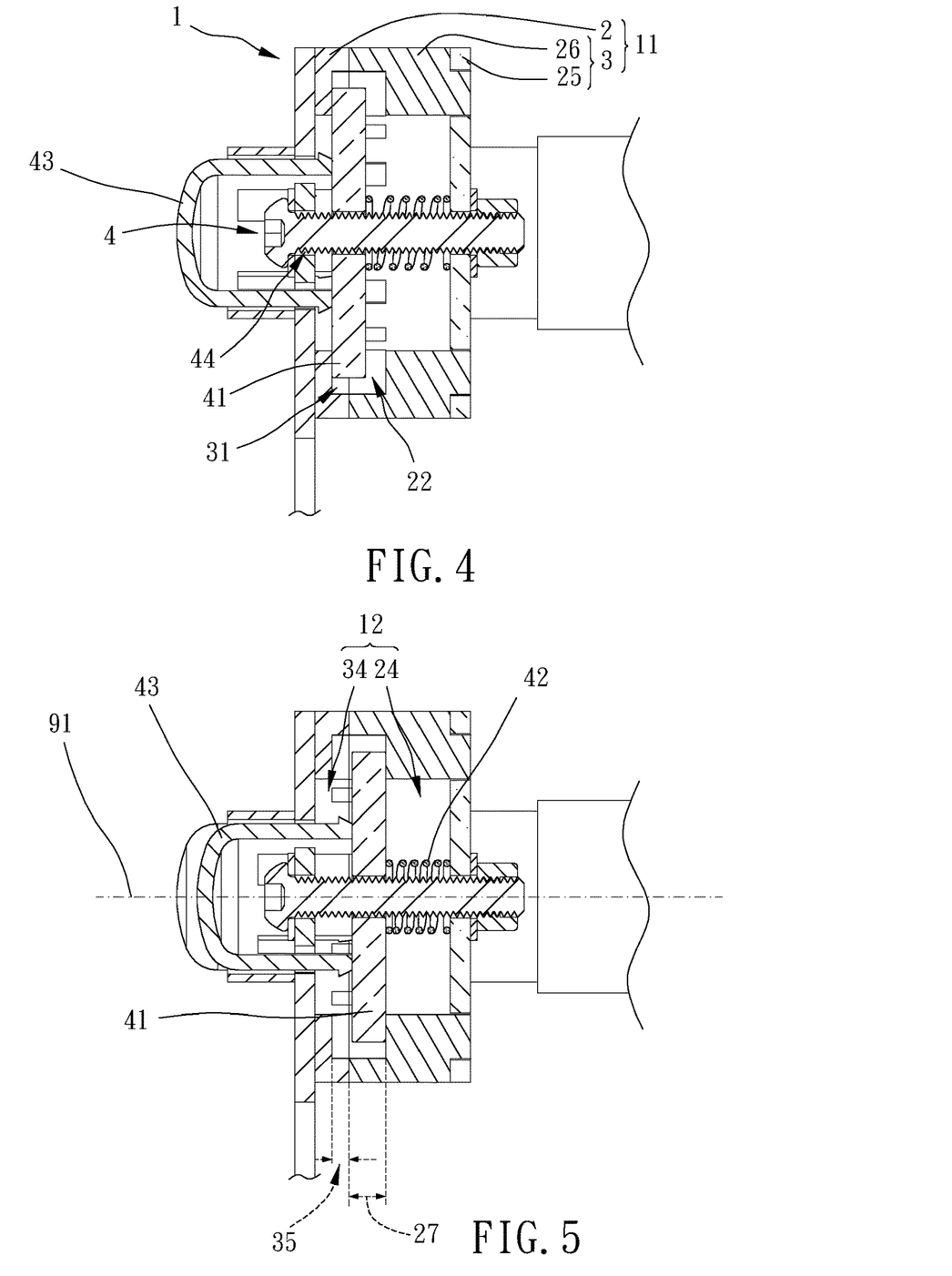
FIG. 4 to FIG. 5 are illustrations showing a first embodiment of a fixation assembly of the present invention.
Figure 6:
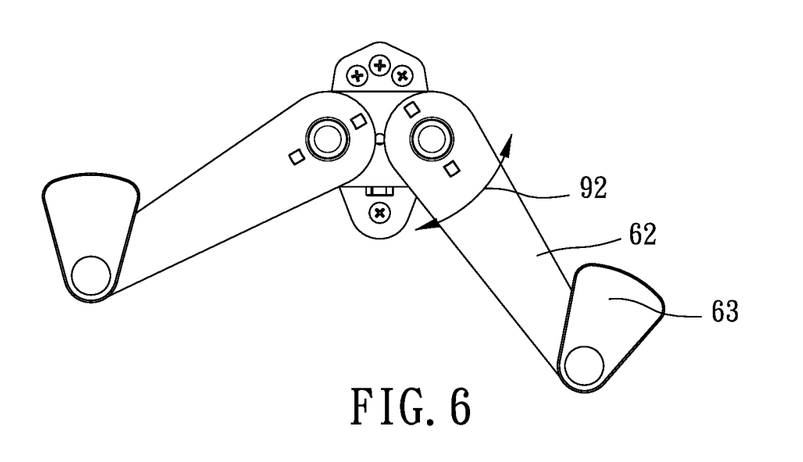
FIG. 6 to FIG. 7 are illustration showing a first embodiment of the present invention during pivoting.
Figure 7:
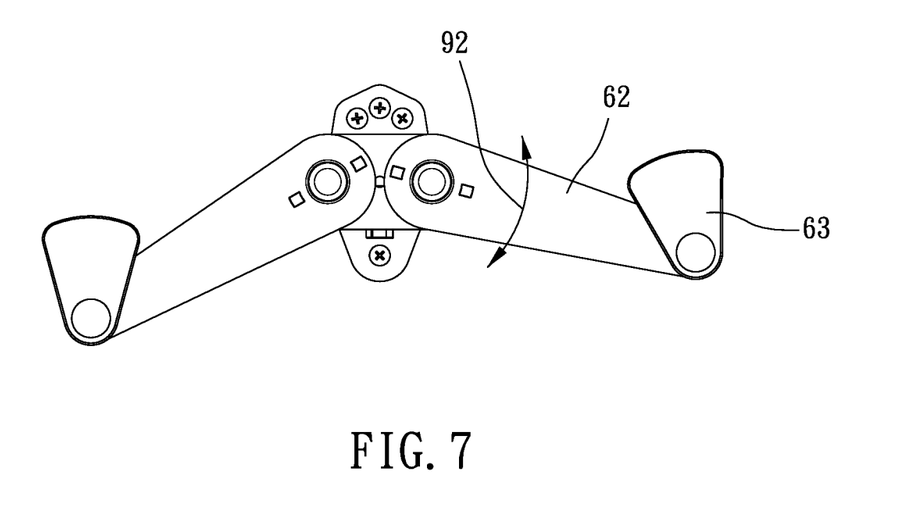
Figure 8:
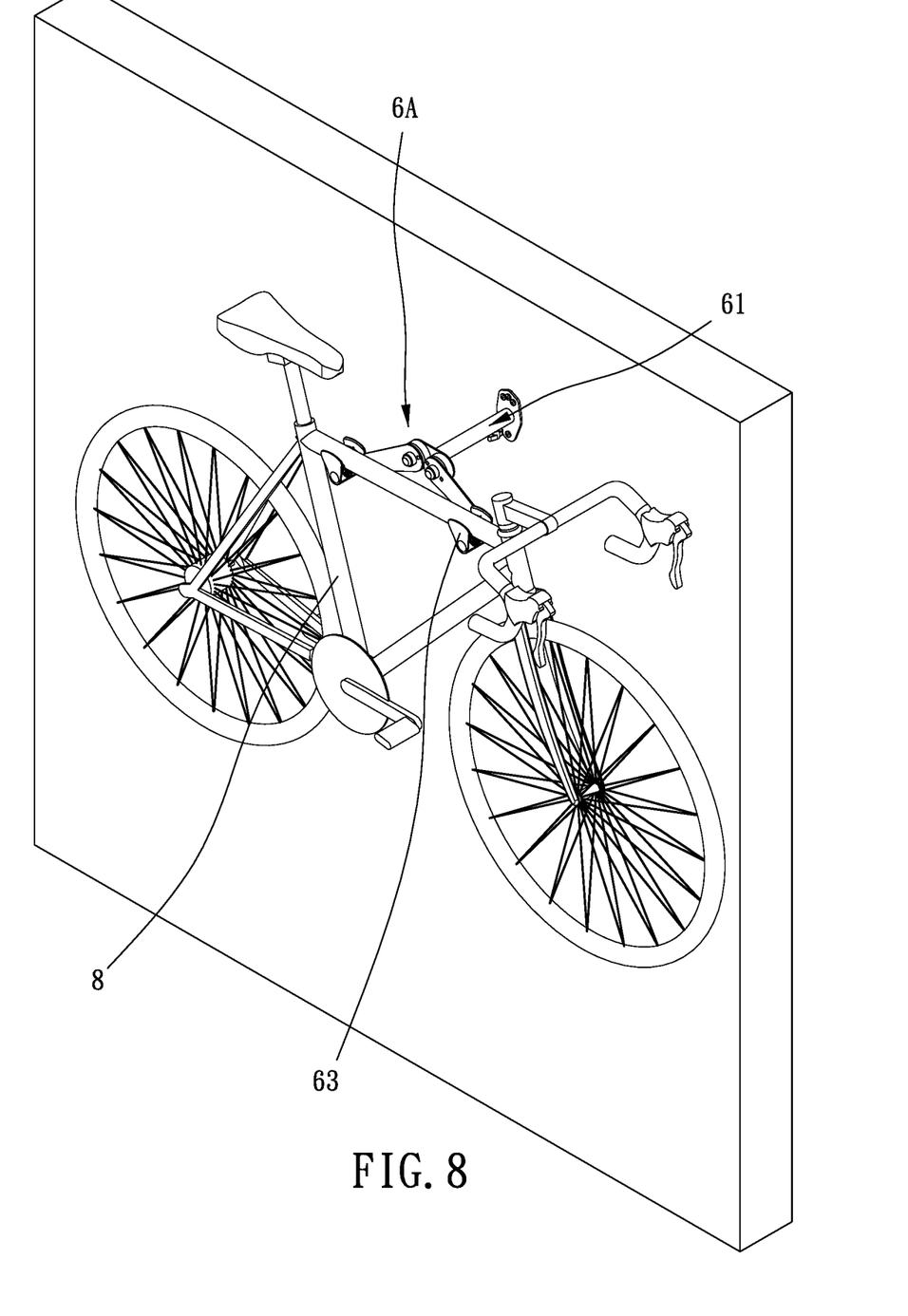
FIG. 8 is an illustration showing a first embodiment of the present invention.

The locking position is defined at a situation that the first fixation member 41 blocks both the at least one first coupling portion 21 and the at least one second coupling portion 31 along the rotation direction 92, and that the first member 2 is nonrotatable with respect to the second member 3. The release position is defined at a situation that the first fixation member 41 is completely received in the first space 24, that the at least one second coupling portion 31 is not blocked by the first fixation member 41 along the rotation direction 92, and that the second member 3 is rotatable with respect to the first member 2.

When the first pushing member 43 is not pressed, the first elastic member 42 triggers the first fixation member 41 to return to the locking position so that the first member 2 and the second member 3 maintain at the fixed positions. In the present embodiment, the first elastic member 42 is biased between the first fixation member 41 and the first member 2.

Preferably, the fixation assembly 4 further includes a sliding axle 44. The sliding axle 44 is inserted through the rotation assembly 11 along the axis 91. The first fixation member 41 is slidable in the first receiving space 12 along the sliding axle 44. The sliding axle 44 provides support to the first fixation member 41 to make it stable during sliding. In the present embodiment, the first elastic member 42 is sleeved onto the sliding axle 44 to restrict the extension direction of the first elastic member 42.

Specifically, the first fixation member 41 is movable in a first distance 27 along the axis 91 in the first space 24 wherein the first distance 27 is larger than or equal to a thickness of the first fixation member 41. Thereby, when the first fixation member 41 is located at the release position, the first fixation member 41 can be completely received in the first space 24 to avoid from blocking the at least one second coupling portion 31 of the second member 3. Besides, the first fixation member 41 is movable in a second distance 35 along the axis 91 in the second space 34 wherein the second distance 35 is smaller than the first distance 27. Thereby, when the first fixation member 41 is located at the locking position, the first fixation member 41 is received in both the first space 24 and the second space 34 to block both the at least one first coupling portion 21 and the at least one second coupling portion 31. In addition, the depth of the first space 24 is 2 to 3 times the depth of the second space 34. In the present embodiment, the depth of the first space 24 is twice the depth of the second space 34.

Figure 2:
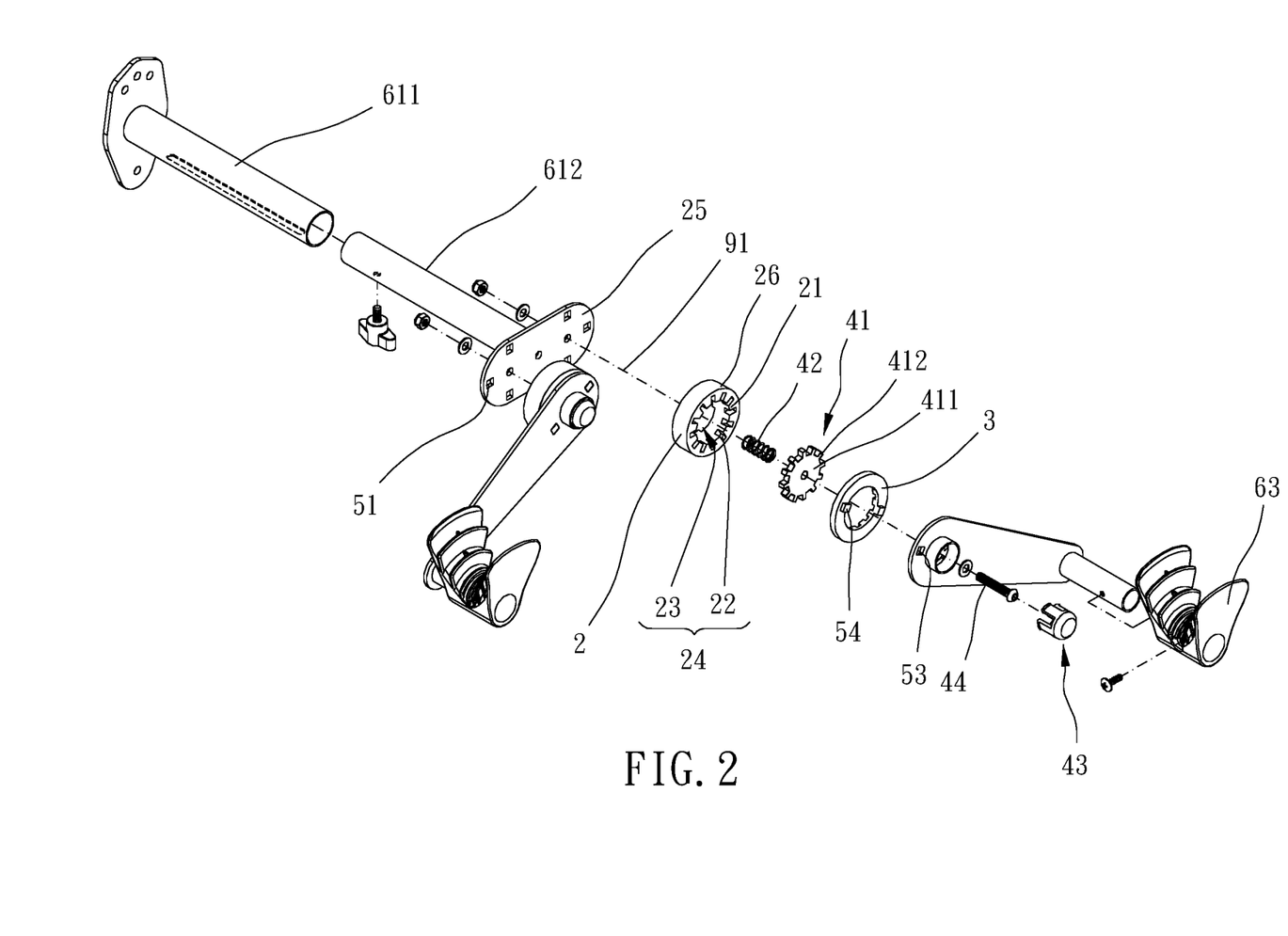
FIG. 2 is a breakdown drawing showing a first embodiment of the present invention.
Figure 3:
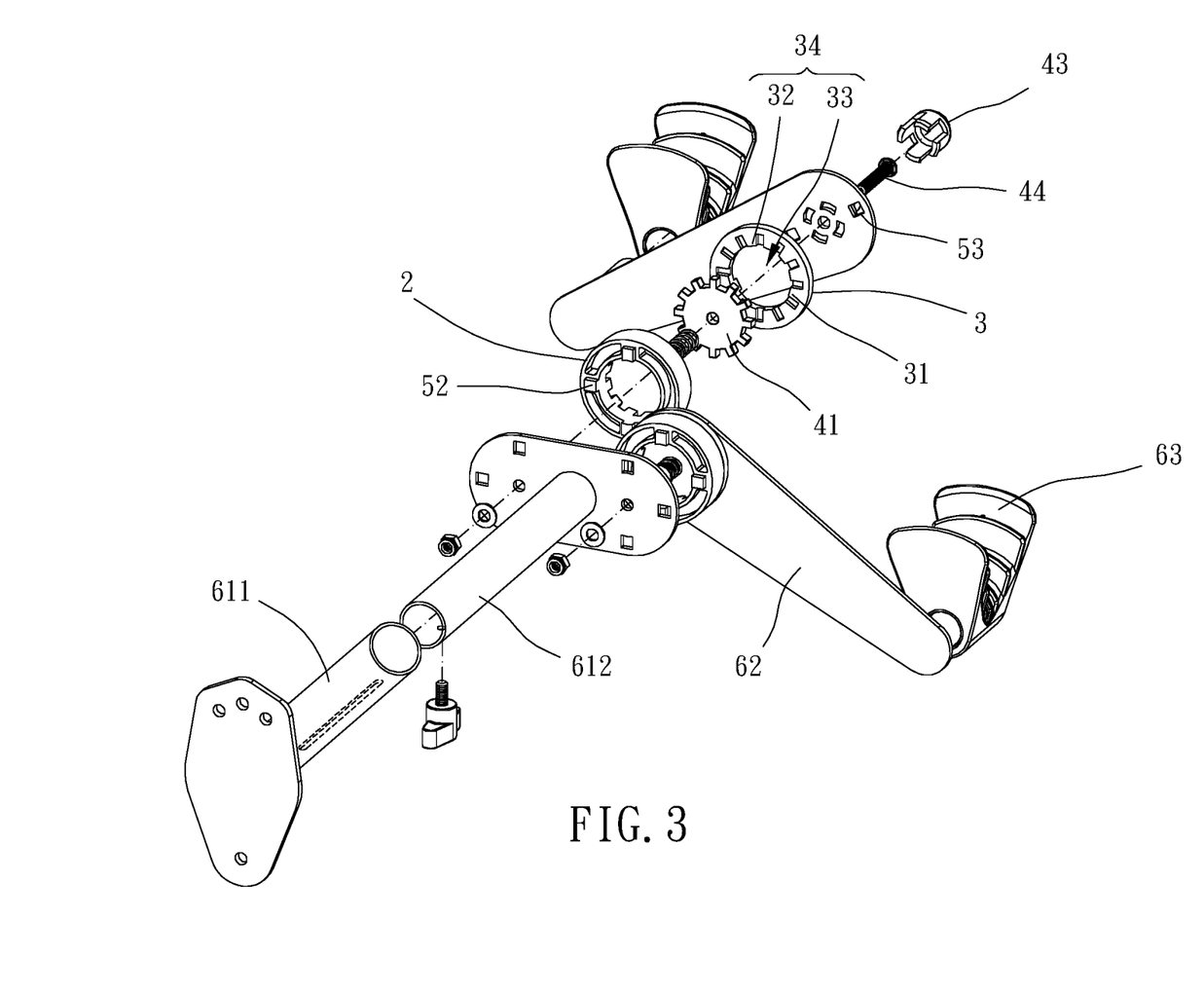
FIG. 3 is a breakdown drawing showing a first embodiment of the present invention at an other angle.

More specifically, the first member 2 includes a base portion 25 and a cylinder body 26. One of the base portion 25 and the cylinder body 26 is formed with a plurality of first notches 51, and the other one of the base portion 25 and the cylinder body 26 is formed with a plurality of first protruding portions 52. The first protruding portions 52 and the first notches 51 are engaged so that the base portion 25 and the cylinder body 26 are engaged to form the first member 2. In the present embodiment, the first protruding portion 52 is a rectangle piece, and the first notch 51 is a rectangle hole. The two-piece first member 2 is easy to disassemble and to store. When abrasion occurs, only a part of the members has to be replaced. Similarly, the second member 3 can be also a two-piece structure.

In the present embodiment, the at least one first coupling portion 21 includes a plurality of said first coupling portions 21 arranged isometrically. The number of the at least one second coupling portion 31 is the same with the number of the first coupling portions 21, and the second coupling portions 31 has the same arrangement with the first coupling portions 21.

Specifically, the first coupling portions 21 define a plurality of first recesses 22, and the second coupling portions 31 define a plurality of second recesses 32. The first space 24 includes a first receiving portion 23 and the first recesses 22. The first recesses 22 surround and communicate the first receiving portion 23. The second space 34 includes a second receiving portion 33 and the second recesses 32. The second recesses 32 surround and communicate the second receiving portion 33.

More specifically, the first fixation member 41 includes a main body 411 and a plurality of stopping portions 412. The stopping portions 412 extend from the main body 411 and are arranged isometrically. The number and the arrangement of the stopping portions 412 are the same with the first recesses 22. The main body 411 is movable between the first receiving portion 23 and the second receiving portion 33. The stopping portions 412 are movable between the first recesses 22 and the second recesses 32. The first fixation member 41 is a gear plate. The number of the first coupling portions 21 is an even number to provide an even support.

Figure 1:
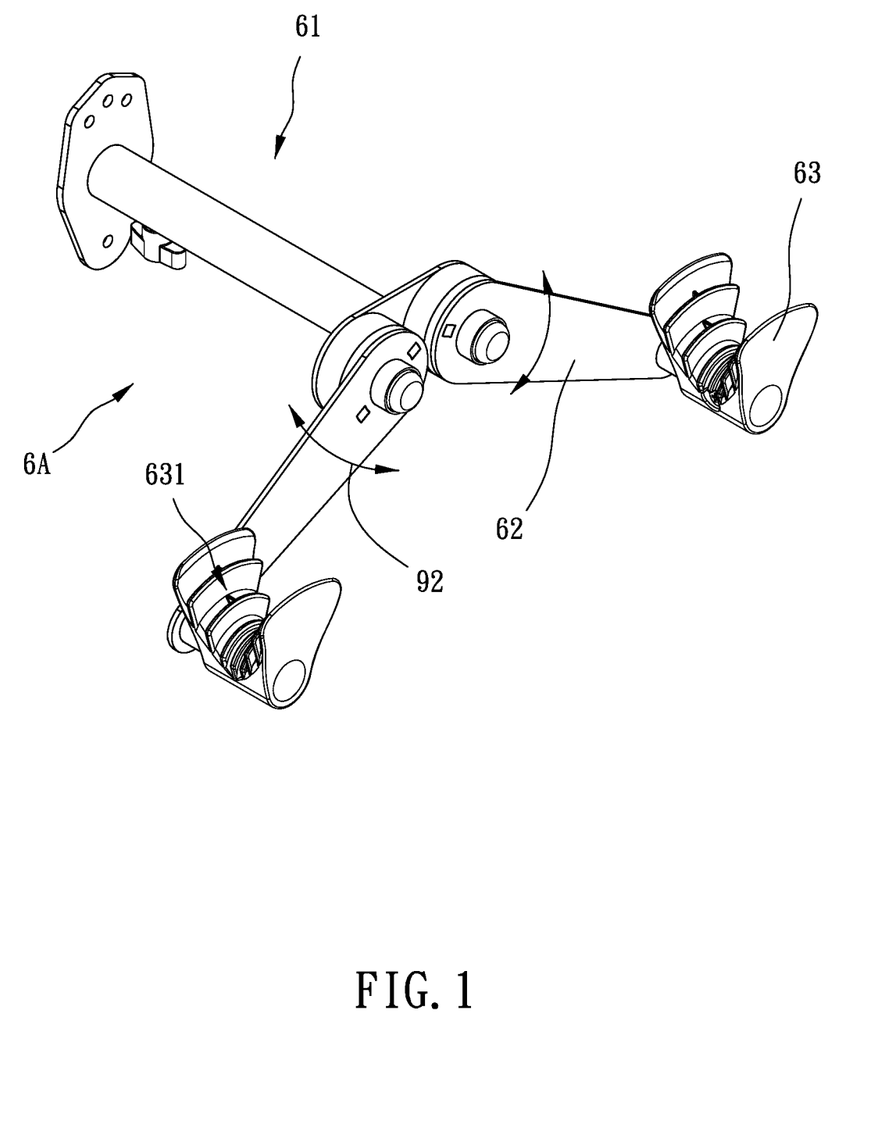
FIG. 1 is a stereogram showing a first embodiment of the present invention.

The present invention also provides a carrier positioning device 6A to carry a vehicle 8. The carrier positioning device 6A includes an extension assembly 61, at least one said pivoting mechanism 1, at least one pivot arm 62, and at least one suspension member 63.

The extension assembly 61 includes a fixed rod 611 and an extending rod 612. The fixed rod 611 can be fixed on the wall, and the extending rod 612 is movably disposed on the fixed rod 611 to adjust the length. The first member 2 of the at least one pivoting mechanism 1 is disposed on the extending rod 612. The at least one pivot arm 62 is disposed on the second member 3 of the at least one pivoting mechanism 1 to be pivotable with the second member 3. Thereby, the angle of the at least one pivot arm 62 can be adjusted by the at least one pivoting mechanism 1 pivoting with respect the extension assembly 61.

Besides, the first pushing member 43 of the at least one pivoting mechanism 1 is inserted through the at least one pivot arm 62 along the axis 91 to be available for pressing. By pressing the first pushing member 43, the first fixation member 41 is moved to the release position. The at least one suspension member 63 is disposed on the at least one pivot arm 62. The at least one suspension member 63 is formed with a recessed supporting portion 631 for receiving a part of the vehicle 8, such as a top tube of a bicycle.

Preferably, the supporting portion 631 has a stepped inner wall to fit the top tubes in different sizes.

In the present embodiment, the at least one pivoting mechanism 1 includes two said pivoting mechanisms 1. The at least one pivot arm 62 includes two said pivot arms 62. The at least one suspension member 63 includes two said suspension members 63. The first members 2 of the pivoting mechanisms 1 are symmetrically arranged at two opposite sides of the extending rod 612 so that the carrier positioning device 6A is symmetrical to support the vehicle 8 stably. Specifically, one of the second member 3 of the pivoting mechanism 1 and the pivot arm 62 is formed with a plurality of second notches 53, and the other one of the second member 3 of the pivoting mechanism 1 and the pivot arm 62 is formed with a plurality of second protruding portions 54. The second protruding portions 54 and the second notches 53 are engaged so that the second member 3 and the pivot arm 62 are engaged. The two pivot arms 62 are pivotable with respect to the extension assembly 61 by the two pivoting mechanisms 1.

Figure 9:
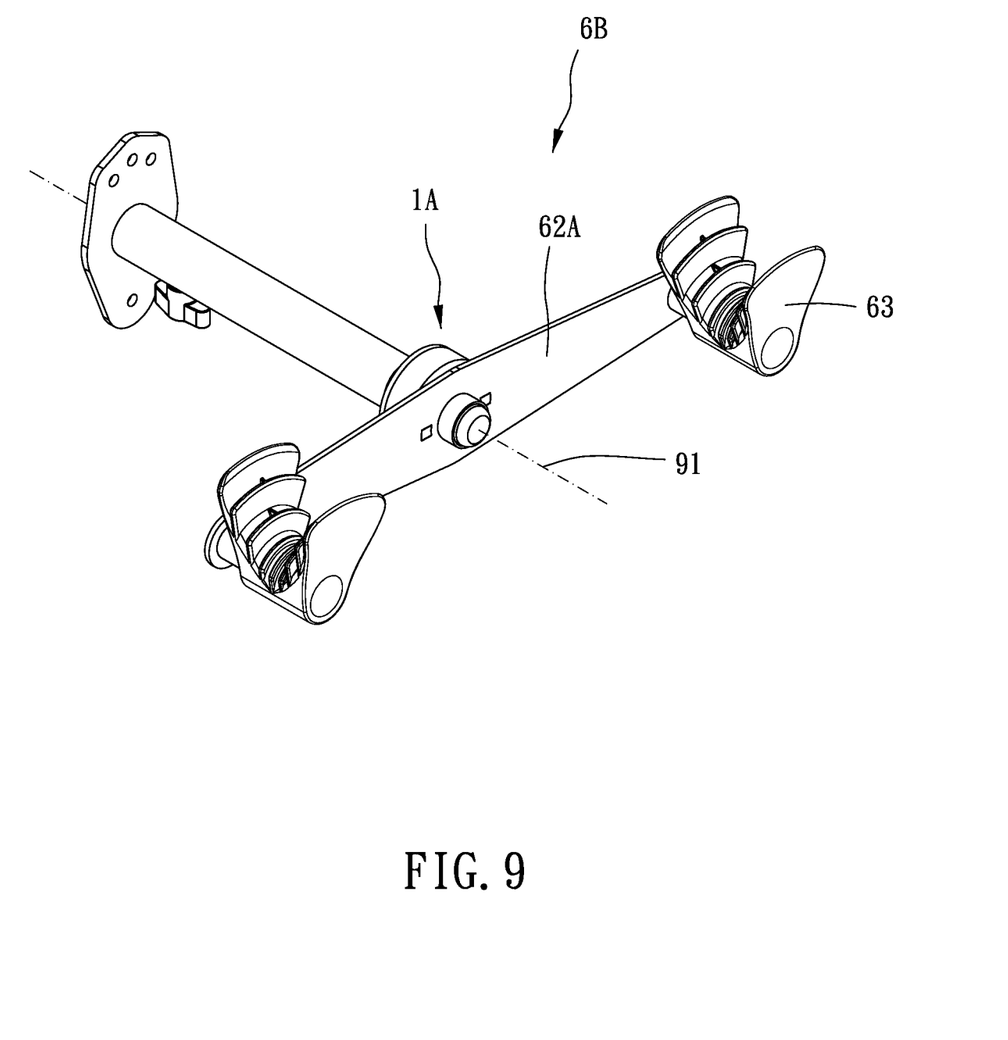
FIG. 9 is a stereogram showing a second embodiment of the present invention.
Figure 10:
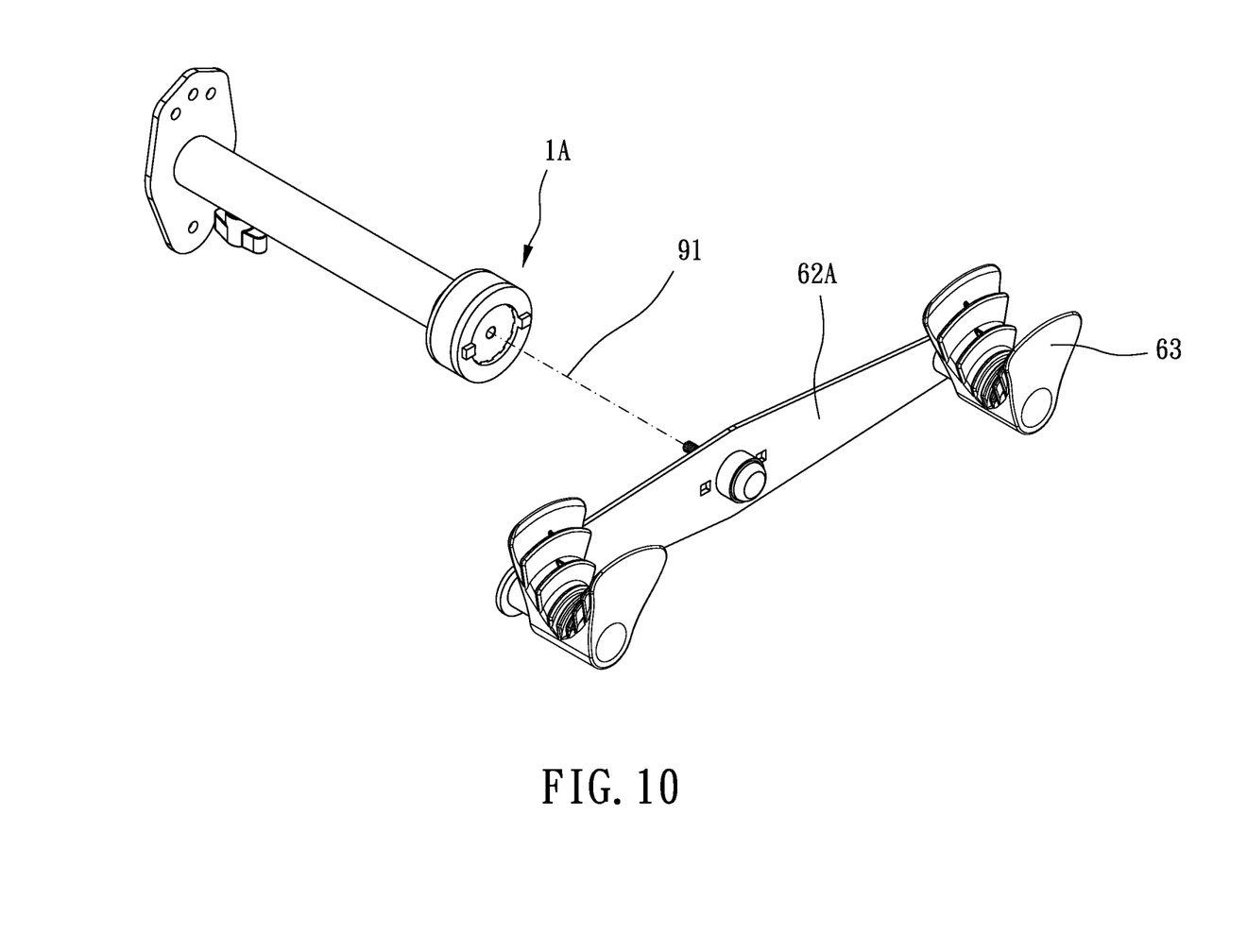
FIG. 10 is a breakdown drawing showing a second embodiment of the present invention.

FIG. 9 and FIG. 10 show a carrier positioning device 6B of the second embodiment of the present invention, the at least one pivoting mechanism 1A includes two said pivoting mechanisms 1A. The at least one pivot arm 62A includes one said pivot arm 62A. The at least one suspension member 63 includes two said suspension members 63. The two suspension members 63 are symmetrically arranged on the pivot arm 62A.

Figure 11:
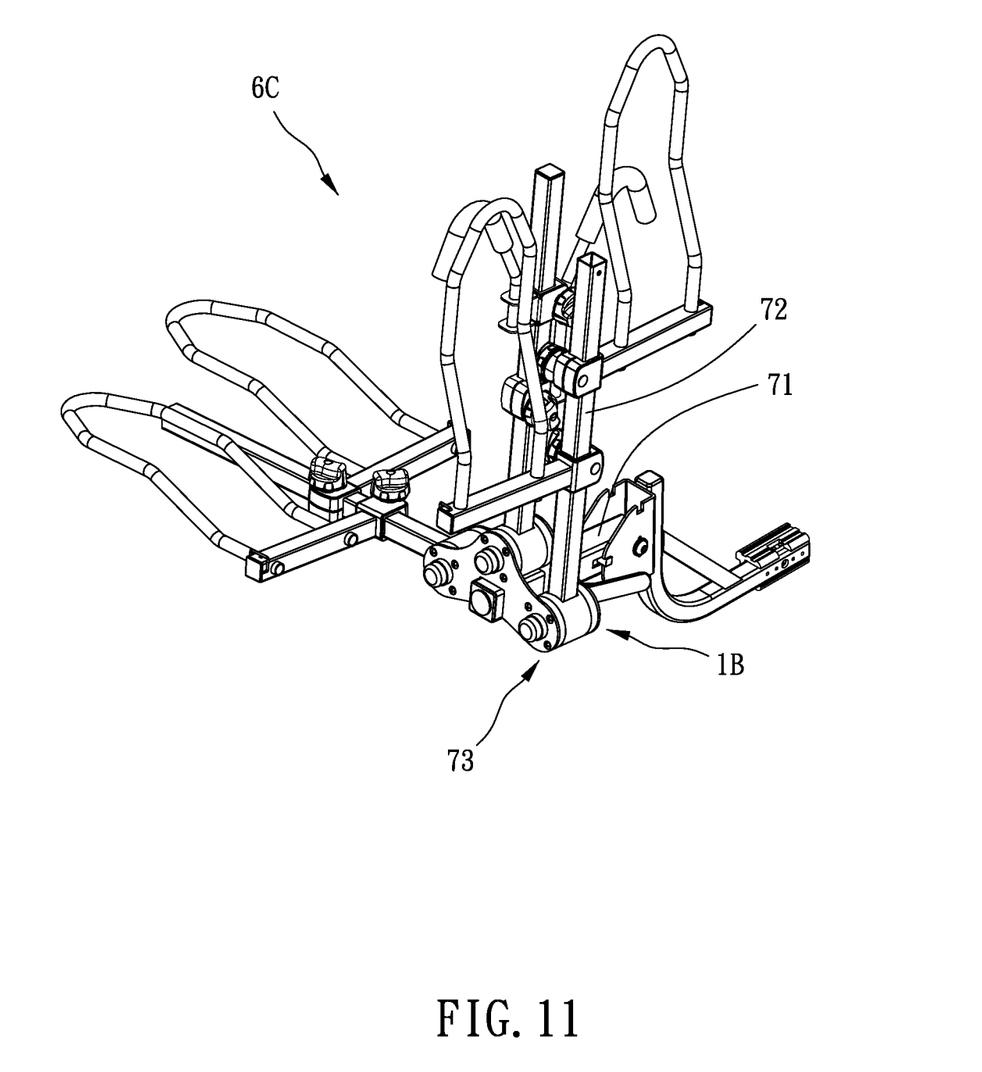
FIG. 11 is a stereogram showing a third embodiment of the present invention.
Figure 12:
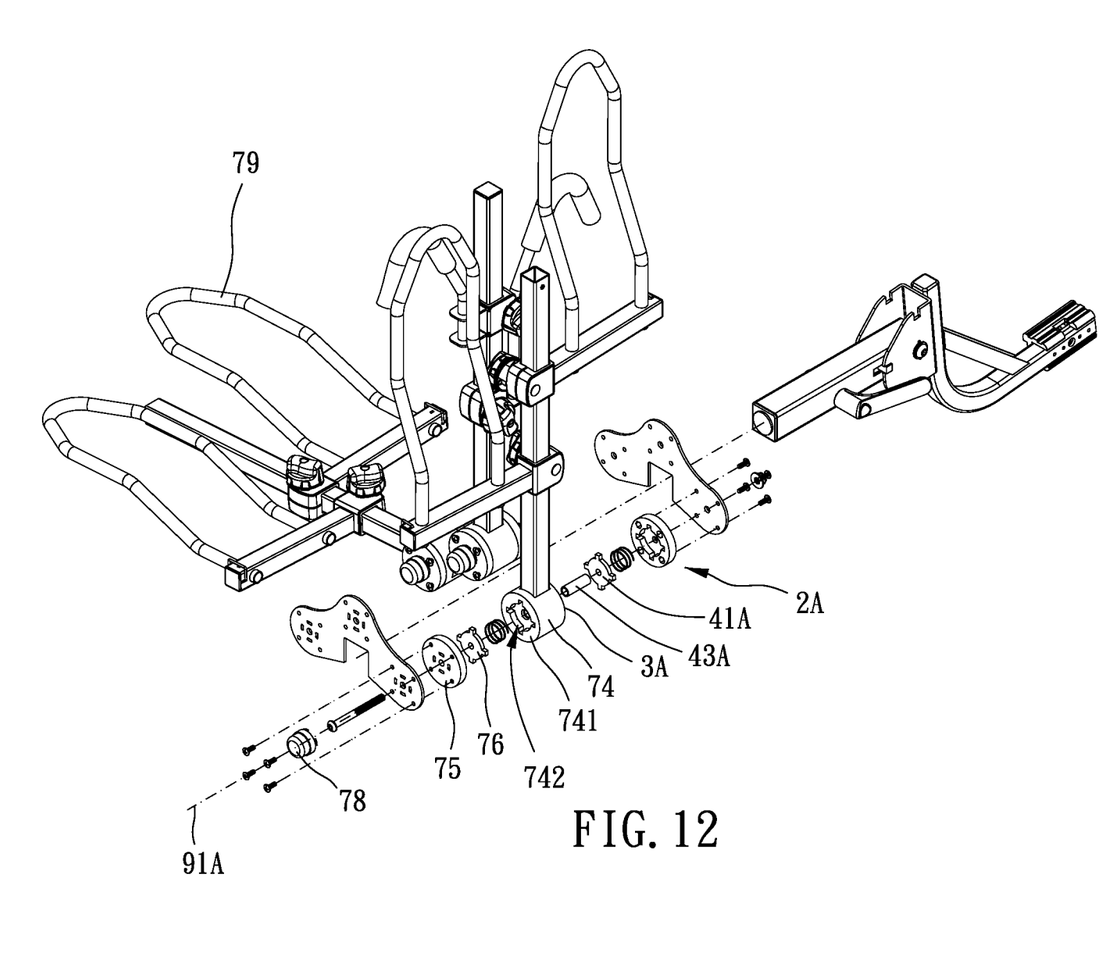
FIG. 12 is a breakdown drawing showing a third embodiment of the present invention.
Figure 13:
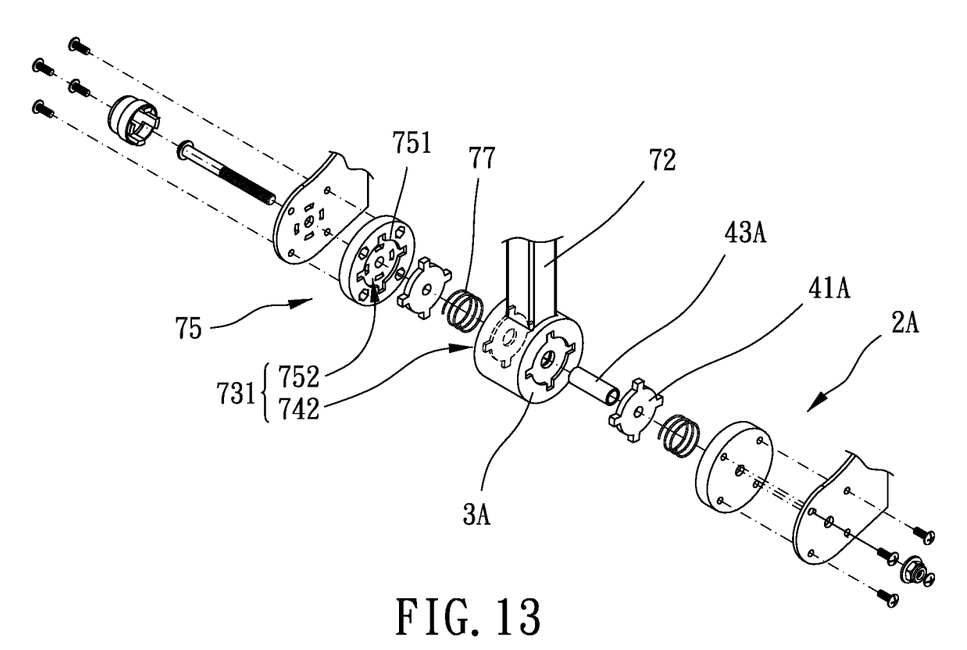
FIG. 13 is a partial enlargement of FIG. 12 at an other angle.

Please refer to FIG. 11 to FIG. 13 for the third embodiment, the carrier positioning device 6C includes a main rod 71, a plurality of supporting rods 72, a plurality of restriction members 79, a plurality of pivoting mechanisms 1B, and a plurality of auxiliary pivoting mechanisms 73.

The main rod 71 can be disposed on a car. The restriction members 79 are disposed on the supporting rods 72. The restriction members 79 are adapted for abutting against and restrict the vehicle 8, such as the bicycle in FIG. 8. The first members 2A of the pivoting mechanisms 1B are disposed on the main rod 71. The second members 3A of the pivoting mechanism 1B are disposed on the supporting rods 72. Thereby, the supporting rods 72 are pivotable with respect to the main rod 71. The first pushing members 43A of the pivoting mechanisms 1B are arranged along an axis 91A.

Specifically, the auxiliary pivoting mechanisms 73 are used to enhance the structure strength and the durability of the pivoting mechanisms 1B. The auxiliary pivoting mechanisms 73 help share the force when the first fixation members 41A are located at the locking position, and make the supporting rods 72 stable when pivoting.

More specifically, each of the auxiliary pivoting mechanism 73 includes a third member 74, a fourth member 75, a second fixation member 76, a second elastic member 77, and a second pushing member 78. The third member 74 and the fourth member 75 are coaxially arranged along the axis 91 and are rotatable with respect to each other. The third member 74 includes at least one third coupling portion 741 and a third space 742. The at least one third coupling portion 741 extends into the third space 742 along a direction nonparallel to the axis 91A. The fourth member 75 is connected to the first member 2A. The fourth member 75 includes at least one fourth coupling portion 751 and a fourth space 752. The at least one fourth coupling portion 751 extends into the fourth space 752 along a direction nonparallel to the axis 91A. The fourth space 752 communicates the third space 742 along the axis 91A. The second fixation member 76 blocks at least one of the at least one third coupling portion 741 and the at least one fourth coupling portion 751 along the rotation direction 92. The second elastic member 77 is received in the second receiving room 731. The second pushing member 78 is movably inserted through the fourth member 75 to selectively push the second fixation member 76.

More specifically, the third member 74 and the second member 3A are arranged coaxially. In the third embodiment, the third member 74 and the second member 3A are formed as a single member. The first pushing member 43A is inserted through the second member 3A and the third member 74 and into the second receiving room 731 to abut against the second fixation member 76 so that the first fixation member 41A, the first pushing member 43A, and the second fixation member 76 are movable coaxially.

Specifically, when the first fixation member 41A is located at the locking position, the second fixation member 76 blocks the at least one third coupling portion 741 and the at least one fourth coupling portion 751. When the first fixation member 41A is located at the release position, the second fixation member 76 blocks the at least one third coupling portion 741 only. In use, the user can press the second pushing member 78 to make the second fixation member 76 drive the first fixation member 41A to move to the release position. Thereby, the supporting rods 72 can pivot freely.

What is claimed is:

1. A pivoting mechanism, for a carrier positioning device, the pivoting mechanism including:
   a rotation assembly, including a first member and a second member, the first member and the second member being coaxially arranged along an axis and being rotatable around the axis, the first member being rotatable with respect to the second member along a rotation direction, the first member defining a first cylinder body having first opening extending therethrough and at least one first coupling portion, the first opening defining a substantial portion of a first space, the at least one first coupling portion extending into the first space along a direction nonparallel to the axis, wherein a base portion is mounted to the first cylinder body, the base portion is larger than a diameter of the first cylinder body, the base portion is formed with at least one first notch therein, the first cylinder body comprises at least one integral first protruding portion, the at least one integral first protruding portion is inserted within the at least one first notch so that the base portion and the first cylinder body are secured together,
   the second member defining a second cylinder body having second opening extending therethrough and at least one second coupling portion, the second opening defining a substantial portion of a second space, the at least one second coupling portion extending into the second space along a direction nonparallel to the axis, the second space communicates with the first space along the axis to form a first receiving room; and
   a fixation assembly, including a first fixation member, a first elastic member, and a first pushing member, the first fixation member being received in the first receiving room and being movable along the axis between a locking position and a release position, the first fixation member blocking at least one of the at least one first coupling portion and at least one second coupling portion along the rotation direction, the first elastic member being received in the first receiving room to push the first fixation member toward the locking position, the first pushing member being inserted and pressed through the rotation assembly into the first receiving room so as to drive the first fixation member to move toward the release position;
   wherein in the locking position the first fixation member is received in the first space and the second space to block both the at least one first coupling portion and the at least one second coupling portion along the rotation direction, and that the first member is nonrotatable with respect to the second member; in the release position the first fixation member is completely received in the first space, the at least one second coupling portion is not blocked by the first fixation member along the rotation direction, and the second member is rotatable with respect to the first member.

2. The pivoting mechanism of claim 1, wherein the fixation assembly further includes a sliding axle, the sliding axle is inserted through the rotation assembly along the axis, the first fixation member is slidable along the sliding axle in the first receiving room.

3. The pivoting mechanism of claim 1, wherein the at least one first coupling
   portions includes a plurality of said first coupling portions, the first coupling portions are spaced and arranged isometrically, the at least one second coupling portion includes a plurality of said second coupling portions numbering the same amount as a number of the first coupling portions; the first opening defines a first receiving portion of the first space and the first space further includes a plurality of first recesses, the first recesses surround the first receiving portion and communicate with the first receiving portion, the second opening defines a second receiving portion of the second space and the second space further includes a plurality of second recesses, the second recesses surround the second receiving portion and communicate the second receiving portion;
   the first fixation member includes a main body and a plurality of stopping portions, the stopping portions are arranged isometrically and extend from the main body, a number of the stopping portions is the same as a number of the first recesses, the stopping portions are arranged in a pattern which is the same as a pattern that the first recesses are arranged in, the main body is movable between the first receiving portion and the second receiving portion, the stopping portions are movable between the first recesses and the second recesses.

4. The pivoting mechanism of claim 1, wherein the first fixation member is movable in a first distance along the axis in the first space, the first distance is larger than or equal to a thickness of the first fixation member, the first fixation member is movable in a second distance along the axis in the second space, the second distance is smaller than the first distance.

5. The pivoting mechanism of claim 3, the fixation assembly further includes a sliding axle, the sliding axle is inserted through the rotation assembly along the axis, the first fixation member is slidable along the sliding axle in the first receiving room; the first fixation member is movable in a first distance along the axis in the first space, the first distance is larger than or equal to a thickness of the first fixation member, the first fixation member is movable in a second distance along the axis in the second space, the second distance is smaller than the first distance; a number of the first coupling portions is an even number; a depth of the first space is 2 to 3 times a depth of the second space; the first protruding portions are rectangle pieces, the first notches are rectangle holes; the first elastic member is biased between the first fixation member and the first member; the first elastic member is sleeved onto the sliding axle; the first fixation member is a gear plate.

6. A carrier positioning device, including:
   an extension assembly, including a fixed rod and an extending rod, the extending rod being movably disposed on the fixed rod;
   at least one said pivoting mechanism of claim 1, the first member of the at least one pivoting mechanism being disposed on the extending rod; at least one pivot arm, connected to the second member of the at least one pivoting mechanism to be pivotable with the second member of the at least one pivoting mechanism, the first pushing member of the at least one pivoting mechanism being inserted through the at least pivot arm along the axis for being pressed; and at least one suspension member, disposed on the at least one pivot arm, formed with a recessed supporting portion adapted for receiving a part of a vehicle.

7. The carrier positioning device of claim 6, wherein the at least one pivoting mechanism includes two said pivoting mechanisms, the at least one pivot arm includes two said pivot arms, the at least one suspension member includes two said suspension members, the first members of the two pivoting mechanism are symmetrically arranged at two opposite sides of the extending rod; one of the second member and the pivot arm of each of the pivoting mechanisms is formed with a plurality of second notches, the other one of second member and the pivot arm of each of the pivoting mechanisms is formed with a plurality of second protruding portions, the second notches and the second protruding portions are engaged so that the second members and the second pivot arms are engaged, the two pivot arms are pivotable with respect to the extension assembly via the two pivoting mechanisms.

8. The carrier positioning device of claim 6, wherein the at least one pivoting mechanism includes two said pivoting mechanisms, the at least one pivot arm includes two said pivot arms, the at least one suspension member includes two said suspension members, the two suspension members are symmetrically arranged on the pivot arms.

* * * * *